US010431826B2

(12) United States Patent
Takebayashi (10) Patent No.: US 10,431,826 B2
(45) Date of Patent: Oct. 1, 2019

(54) NONAQUEOUS ELECTROLYTE SECONDARY BATTERY

(71) Applicant: TOYOTA JIDOSHA KABUSHIKI KAISHA, Toyota-shi, Aichi-ken (JP)

(72) Inventor: Yoshitomo Takebayashi, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 272 days.

(21) Appl. No.: 14/915,425

(22) PCT Filed: Aug. 26, 2014

(86) PCT No.: PCT/IB2014/001623
§ 371 (c)(1),
(2) Date: Feb. 29, 2016

(87) PCT Pub. No.: WO2015/028869
PCT Pub. Date: Mar. 5, 2015

(65) Prior Publication Data
US 2016/0211520 A1  Jul. 21, 2016

(30) Foreign Application Priority Data
Aug. 29, 2013  (JP) .................................. 2013-177939

(51) Int. Cl.
*H01M 4/62* (2006.01)
*H01M 10/0525* (2010.01)
(Continued)

(52) U.S. Cl.
CPC ............. *H01M 4/62* (2013.01); *H01M 4/131* (2013.01); *H01M 4/505* (2013.01); *H01M 4/525* (2013.01);
(Continued)

(58) Field of Classification Search
CPC .... H01M 4/131; H01M 2220/30; H01M 4/62; H01M 10/0525; H01M 10/0569;
(Continued)

(56) References Cited

U.S. PATENT DOCUMENTS 5,962,167 A     10/1999  Nakai et al.
2007/0275303 A1*  11/2007  Ishimatsu .............. C01G 51/42
                                                  429/221
(Continued)

FOREIGN PATENT DOCUMENTS

CN     101257133 A     9/2008
JP      11273674 A    10/1999
(Continued)

*Primary Examiner* — Lisa S Park
(74) *Attorney, Agent, or Firm* — Sughrue Mion, PLLC (57) ABSTRACT

According to the present invention, a nonaqueous electrolyte secondary battery that includes a positive electrode, a negative electrode and a nonaqueous electrolyte is provided. The positive electrode has an operation upper limit potential of 4.3 V or more based on metal lithium and includes a positive electrode active material and an inorganic phosphate compound that has ion conductivity. The inorganic phosphate compound is in a particle state. A ratio of particles having a particle size of 20 μm or more is 1% by volume or less when an entirety of the inorganic phosphate compound is set to 100% by volume. Further, a ratio of particles having a particle size of 10 μm or more may be 10% by volume or less when an entirety of the inorganic phosphate compound is set to 100% by volume.

14 Claims, 3 Drawing Sheets

(51) Int. Cl.
*H01M 4/131* (2010.01)
*H01M 4/505* (2010.01)
*H01M 4/525* (2010.01)
*H01M 10/0569* (2010.01)
*H01M 10/052* (2010.01)
*H01M 4/02* (2006.01)

(52) U.S. Cl.
CPC ....... *H01M 4/628* (2013.01); *H01M 10/0525* (2013.01); *H01M 10/0569* (2013.01); *H01M 10/052* (2013.01); *H01M 2004/028* (2013.01); *H01M 2220/20* (2013.01); *H01M 2300/0034* (2013.01)

(58) Field of Classification Search
CPC ...... H01M 4/525; H01M 4/505; H01M 4/628; H01M 2004/028; H01M 2220/20; H01M 10/052; H01M 2300/0034
See application file for complete search history.

(56) References Cited

U.S. PATENT DOCUMENTS

| | | |
|---|---|---|
| 2008/0020283 A1 | 1/2008 | Miyashiro et al. |
| 2008/0118839 A1 | 5/2008 | Yamamoto et al. |
| 2008/0241694 A1 | 10/2008 | Kaiduka et al. |
| 2008/0261117 A1 | 10/2008 | Iwanaga et al. |
| 2009/0123839 A1 | 5/2009 | Soma et al. |
| 2009/0181311 A1 | 7/2009 | Iwanaga et al. |
| 2014/0242475 A1 | 8/2014 | Koh et al. |

FOREIGN PATENT DOCUMENTS

| | | |
|---|---|---|
| JP | 2003173770 A | 6/2003 |
| JP | 2008251218 A | 10/2008 |
| JP | 2009123463 A | 6/2009 |
| JP | 2009211950 A | 9/2009 |
| JP | 2013093322 A | 5/2013 |
| JP | 2014103098 A | 6/2014 |
| WO | 2006018921 A1 | 2/2006 |
| WO | 2007139130 A1 | 12/2007 |

* cited by examiner

NONAQUEOUS ELECTROLYTE SECONDARY BATTERY

BACKGROUND OF THE INVENTION

1. Field of the Invention

The present invention relates to a nonaqueous electrolyte secondary battery. In more detail, the present invention relates the battery in which an operation upper limit potential of a positive electrode is set to 4.3 V or more based on metal lithium.

2. Description of Related Art

Since a nonaqueous electrolyte secondary battery such as a lithium ion secondary battery has weight lighter and energy density higher than a conventional battery, it is preferably used in a so-called portable power source, an on-vehicle high output power source, and the like.

Now, in the nonaqueous electrolyte secondary battery, as part of performance improvement, it is under study to achieve higher energy density. Such a higher energy density can be realized by setting, for example, an operation potential of the positive electrode higher than ever before. However, when an operation upper limit potential of the positive electrode is set to, for example, about 4.3 V or more based on metal lithium, in consequence of high potential of the positive electrode, the battery characteristics (typically, endurance, for example, cycle characteristics) may deteriorate. As a technique relating to this, Japanese Patent Application Publication No. 2003-173770 (JP 2003-173770 A) is cited. JP 2003-173770 A describes to the effect that a decomposition reaction of a nonaqueous electrolyte in a high potential state can be suppressed from occurring and self-discharge and battery swelling during exposure to high temperature can be reduced by coating a surface of particles of an active material with lithium ion conductive glass.

SUMMARY OF THE INVENTION

However, as described in paragraph [0042] of JP 2003-173770 A, the electron conductivity of the lithium-ion conductive glass is generally very low. Therefore, when a surface of particles of the active material particles is coated with the lithium-ion conductive glass, the electron conductivity may be damaged and the internal resistance may be increased. Such an increase in the internal resistance can be problematic in particular in a battery that is used under a mode in which high-rate charge/discharge is repeated (for example, a battery used as a power source of a vehicle). The present invention provides a high-energy density nonaqueous electrolyte secondary battery in which the operation upper limit potential of the positive electrode is set to 4.3 V or more based on lithium metal and that combines excellent input/output characteristics and high endurance.

An aspect of the present invention relates to a nonaqueous electrolyte secondary battery. The nonaqueous electrolyte secondary battery includes a positive electrode, a negative electrode and a nonaqueous electrolyte. The positive electrode includes a positive electrode active material and an inorganic phosphate compound having ion conductivity. The operation upper limit of the positive electrode is 4.3 V or more based on lithium metal (hereinafter, a potential based on lithium metal may be represented by "vs. Li/Li$^+$"). The inorganic phosphate compound is in a particulate state. When an entirety of the inorganic phosphate compound is set to 100% by volume, A ratio of particles of the inorganic phosphate compound having a particle size of 20 μm or more is 1% by volume or less.

When the operation upper limit potential of the positive electrode is set to 4.3 V or more, a potential difference (voltage) between the positive and negative electrodes can be set larger and a battery having a high energy density can be realized thereby. Further, when the positive electrode includes the inorganic phosphate compound, at least one of effects shown below can be exerted. (1) A decomposition reaction (hydrolysis reaction) of the nonaqueous electrolyte (typically, a supporting salt contained in the electrolyte, for example, LiPF$_6$) in a high potential state can be suppressed. (2) Hydrofluoric acid (HF) generated by the hydrolysis reaction of the supporting salt (for example, LiPF$_6$) is trapped in the inorganic phosphate compound and the acidity of the nonaqueous electrolyte can be alleviated thereby. (3) According to charge/discharge processes described later, a film that is stable and has relatively low resistance. (a film that contains LiF, for example) can be formed on a surface of the positive electrode active material. Therefore, the positive electrode active material can be suppressed from being deteriorated (for example, elution of constituent elements) and a battery having high endurance can be realized thereby. In addition, when a ratio of coarse particles having a particle size of 20 μm or more of the inorganic phosphate compound is reduced more than ever before, a preferable conductive path can be formed in the positive electrode (typically, a positive electrode active material layer) and the internal resistance can drastically be reduced thereby. Therefore, the nonaqueous electrolyte secondary battery having the structure described above can realize, in addition to high energy density and high endurance, excellent input/output characteristics.

Here, the "nonaqueous electrolyte secondary battery having the operation upper limit potential (of the positive electrode) of 4.3 V or more based on metal lithium" means a nonaqueous electrolyte secondary battery having a redox potential (operation upper limit potential) of the positive electrode active material of 4.3 V (vs. Li/Li$^+$) or more in the range of SOC (State of Charge) of 0% to 100%. Further, the "SOC" in the present specification means a state of charge of the battery based on a voltage range in which the battery is usually used. Typically, the "SOC" in the present specification means a state of charge of a battery based on a rated capacity measured under condition in which a voltage, between terminals of the positive and negative electrodes (open circuit voltage: OCV) is the upper limit voltage (for example, 4.9 V) to the lower limit voltage (for example, 3.5 V). Further, the "particle size" in the present specification means, unless stated otherwise, a particle size based on the volume obtained by a particle size distribution measurement based on a laser diffraction light scattering method, that is, it is typically a term that includes a primary particle and a secondary particle. Further, an "occupancy ratio of particles having a particle size of 20 μm or more" can be typically calculated from a particle size distribution based on the volume obtained according to a particle size distribution measurement based on the laser diffraction light scattering method.

In the nonaqueous electrolyte secondary battery described above, the ratio of the particles of the inorganic phosphate compound having the particle size of 20 μm or more may be one or less in 1000 particles of the inorganic phosphate compound. Thus, the effect of the present invention can be exerted at a higher level. A ratio of the particles having a particle size of 20 μm or more in 1000 particles can be calculated from a particle size distribution based on the number obtained by a particle size distribution measurement based on, for example, a flow type image analysis method.

Alternatively, an arithmetic average value obtained by observing at least 1000 (for example, 1000 to 5000) particles with an electron microscope (any of a scanning type or a transmission type electron microscope can be used) can be also adopted. In the nonaqueous electrolyte secondary battery described above, when the entirety of the inorganic phosphate compound is set to 100% by volume, the ratio of the particles of the inorganic phosphate compound having a particle size of 10 μm or more may be 10% by volume or less. From this, the effect of the present invention can be exerted at a further higher level.

A mode diameter of the particles based on the volume of the inorganic phosphate compound described above is not particularly limited. In the nonaqueous electrolyte secondary battery described above, a mode diameter based on the volume of the inorganic phosphate compound may be 0.01 μm or more and 5 μm or less. Since the particles of the inorganic phosphate compound can be preferably filled in a gap of the positive electrode active material thereby, further higher electron conductivity can be imparted to the positive electrode. Alternatively, a mode diameter based on the volume of the inorganic phosphate compound may be 10 μm or more and 15 μm or less. From this, a large contact area (interface) of the positive electrode active material and the nonaqueous electrolytic solution can be secured and further higher input/output characteristics can be realized thereby.

The inorganic phosphate compound described above may include at least one kind of $Li_3PO_4$, LiPON, $Na_3PO_4$, and $Mg_3(PO_4)_2$. Further, a ratio of the inorganic phosphate compound described above may be 0.1 parts by mass or more and 5 parts by mass or less with respect to 100 parts by mass of the positive electrode active material described above.

The positive electrode active material described above may include a lithium manganese composite oxide having a spinel structure, or may include a lithium nickel manganese composite oxide having a spinel structure. From this, the energy density and the endurance can be combined at a further higher level. The positive electrode active material described above may contain 50% by mass or more and 100% by mass or less of the lithium nickel manganese composite oxide based on the positive electrode active material.

The nonaqueous electrolyte described above may include a fluorine-containing nonaqueous solvent (an organic solvent that contains a fluorine atom as a constituent atom), may include fluorinated carbonate, or may include at least one kind of fluorinated carbonate. Since the fluorinated carbonate has a broad potential window on an oxidation side (that is, oxidation resistance is high), the nonaqueous electrolyte can be suppressed from being decomposed by oxidation, and the effect of the present invention can be exerted at a further higher level. Further, when the entirety of the inorganic phosphate compound described above is set to 100% by volume, the ratio of the particles of the inorganic phosphate compound described above having a particle size of 20 μm or more is 0.6% by volume or less.

The nonaqueous electrolyte secondary battery disclosed here (a lithium ion secondary battery, for example) is excellent in energy density, input/output density and endurance. Therefore, by utilizing the effect, the nonaqueous electrolyte secondary battery can be used preferably as a power source (driving power source) of, for example, a hybrid vehicle and an electric vehicle.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, a preferred embodiment of the present invention will be described. Items that are other than those that are particularly referred to in the present specification and that are necessary to perform the present invention (for example, a general manufacturing process of a battery that is not characterized by the present invention) can be grasped as a design matter of a person skilled in a conventional technology in the relevant field. The present invention can be performed based on contents disclosed in the present specification and technical commonsense in the relevant field.

The nonaqueous electrolyte secondary battery disclosed here includes a positive electrode, a negative electrode and a nonaqueous electrolyte. Hereinafter, each of the constituent elements will be sequentially described.

Positive Electrode

The positive electrode of the nonaqueous electrolyte secondary battery disclosed here includes a positive electrode active material and an inorganic phosphate compound having ion conductivity. Such a positive electrode includes typically a positive electrode current collector and a positive electrode active material layer formed on the positive electrode current collector and at least a positive electrode active material and an inorganic phosphate compound. Such a positive electrode can be prepared, for example, in such a manner that a composition obtained by dispersing forming components of the positive electrode active material layer in a proper solvent (N-methyl-2-pyllolidone, for example) is imparted on a surface of the positive electrode current collector and dried. The forming components of the positive electrode active material layer described above can include the positive electrode active material, the inorganic phosphate compound, a conductive material, a binder and the like that are used as required. Further, as the positive electrode current collector, a conductive member made of metal excellent in the conductivity (for example, aluminum, nickel, titanium, stainless steel and the like) can be preferably used.

The positive electrode of the nonaqueous electrolyte secondary battery disclosed here has the operation upper, limit potential in the range of the SOC 0% to 100% of 4.3 V or more (preferably 4.5 V or more, more preferably 4.6 V or more, further preferably 4.7 V or more) based on metal lithium. In general, since an operation potential between the SOC 0% to 100% becomes highest at the SOC 100%, usually, via the operation potential of the positive electrode at the SOC 100% (that is, full charge state), the operation upper limit potential of the positive electrode can be grasped. The technique to be disclosed here can be typically preferably applied to a nonaqueous electrolyte secondary battery of which the operation upper limit potential of the positive electrode in the range of the SOC 0% to 100% is 7.0 V or less (for example, 6.0 V or less, 5.5 V or less) based on metal lithium.

The positive electrode that shows the operation upper limit potential like this can be realized by using the positive electrode active material that has the maximum value of the operation potential in the range of the SOC 0% to 100% of 4.3 V (vs. Li/Li$^+$) or more. Above all, the positive electrode active material of which operation potential at the SOC 100% exceeds 4.3 V, preferably 4.5 V or more, more preferably 4.6 V or more, further preferably 4.7 V or more based on metal lithium can be preferably used.

Here, the operation potential of the positive electrode active material can be measured as shown below, for example. That is, firstly, with the positive electrode that includes the positive electrode active material as a measurement target as a working electrode (WE), a three-pole type cell is formed with such a working electrode, metal lithium as a counter electrode (CE) and a reference electrode (RE), and the nonaqueous electrolyte. Then, the SOC of the cell is adjusted at an interval of 5%, from 0% up to 100% based on a theoretical capacity of the cell. The SOC adjustment like this can be performed by performing a constant current charge between WE-CE by means of, for example, a general charge/discharge device, a potentiostat or the like Then, after the cells adjusted to the respective SOC states are left at rest for 1 hour, a potential between the WE-RE is measured, and the potential is taken as the operation potential (vs. Li/Li$^+$) of the positive electrode active material in the SOC state.

As the positive electrode active material that can preferably realize such a high potential, lithium manganese composite oxides having a spinel structure can be used. Above all, as a preferable aspect, lithium nickel manganese composite oxide represented by a formula (I) below: Li$_x$(Ni$_y$Mn$_{2-y-z}$M$^1{}_z$)O$_{4+\alpha}$A$_q$ (I) can be used. Here, M$^1$ can be an optional transition metal element other than Ni and Mn or a typical metal element (for example, one or two or more kinds selected from Fe, Co, Cu, Cr, Zn and Al). Alternatively, the M$^1$ may be a semimetal element (for example, one or two or more kinds selected from B, Si, and Ge) or a non-metal element. Further, x is $0.8 \leq x \leq 1.2$; y is $0 < y$; z is $0 \leq z$; $y+z < 2$ (typically $y+z \leq 1$) $\alpha$ is $-0.2 \leq \alpha \leq 0.2$ and a value determined so as to satisfy a charge neutral condition; and q is $0 \leq q \leq 1$. According to a preferable aspect, y is $0.2 \leq y \leq 1.0$ (more preferably, $0.4 \leq y \leq 0.6$, for example, $0.45 \leq y \leq 0.55$); and z is $0 \leq z < 1.0$ (for example, $0 \leq z \leq 0.3$). Further, q is $0 \leq q \leq 1$, when q is larger than 0, A can be F or Cl. As a specific example of the lithium nickel manganese oxide represented by the formula (I), LiNi$_{0.5}$Mn$_{1.5}$O$_4$ and the like can be used.

In general, when a transition metal element (in particular, manganese) is contained in the constituent elements of the positive electrode active material, in a high potential state in particular, it is possible that the transition metal element is eluted. However, according to the technique disclosed here, a nonaqueous electrolyte secondary battery that can suppress such a phenomenon from occurring and combines high energy density and high endurance can be realized. Whether a compound (oxide) has a spinel structure can be determined according to, for example, an X-ray structural analysis (preferably, single crystal X-ray structural analysis). Specifically, X-ray diffractometry with Cu K$\alpha$ line can be used to determine.

In the technique disclosed here, the positive electrode active material is preferable to be in a state of particle having an average particle size of about 5 μm to 20 μm (typically, 10 μm to 15 μm, for example, 12 μm to 13 μm). Further, the positive electrode active material having the BET specific surface area of usually about 0.1 m$^2$/g to 30 m$^2$/g is adequate, and that of typically, 0.2 m$^2$/g to 10 m$^2$/g, for example, about 0.5 m$^2$/g to 3 m$^2$/g can be preferably used. The "average particle size" in the present specification means, unless clearly stated otherwise, a particle size corresponding to a 50 volume percent cumulative frequency from a fine particle size side of the particle size in a particle size distribution based on the volume based on a laser diffraction light scattering method (D50, called also as median diameter). Further, the "specific surface area" in the present specification indicates a surface area (BET specific surface area) measured according to a BET method (BET one-point method) that uses nitrogen gas.

The lithium manganese composite oxide having a spinel structure like this (for example, lithium nickel manganese composite oxide) is preferably contained at a ratio of 50% by mass or more (typically, 50% by mass to 100% by mass, for example, 70% by mass to 100% by mass, preferably, 80% by mass to 100% by mass) in an entire positive electrode active material to be used, and the positive electrode active material that essentially includes lithium manganese composite oxide having a spinel structure is more preferable. Alternatively, as long as the effect of the present invention is not significantly degraded, in addition to the lithium manganese composite oxide having a spinel structure described above, other positive electrode active material can be also contained. As a typical example of the other positive electrode active material, an olivine type lithium transition metal composite oxide can be used. More specifically, LiMnPO$_4$, LiFePO$_4$, LiMnPO$_4$F, Li$_2$FeSiO$_4$ and the like can be illustrated.

In the inorganic phosphate compound that is contained in the positive electrode of the nonaqueous electrolyte secondary battery disclosed here, a ratio of the particles having a particle size of 20 μm or more is reduced more than ever before. Specifically, when an entirety of the inorganic phosphate compound contained in the positive electrode is set to 100% by volume, a ratio of the particles having a particle size of 20 μm or more is 1% by volume or less (preferably, 0.8% by volume or less, more preferably, 0.6% by volume or less). From this, since preferable conductive paths can be formed in the positive electrode (typically, positive electrode active material layer), and the internal resistance can be reduced more than ever before thereby. According to a preferable aspect, a ratio of the particles having a particle size of 20 μm or more is one or less in 1000 inorganic phosphate compound particles, above all, it is preferable to be formed of particles having a particle size of less than 20 μm. Form this, further higher electron conductivity can be imparted to the positive electrode (typically, the positive electrode active material layer). Further, according to another preferable aspect, when an entirety of the inorganic phosphate compound contained in the positive electrode is set to 100% by volume, a ratio of the particles having a particle size of 10 μm or more is 10% by volume or less (preferably, 5% by volume or less, and more preferably 1% by volume or less), above all, it is preferable to be formed of particles having a particle size of less than 10 μm. From this, the internal resistance of the positive electrode (typically, the positive electrode active material layer) can be further reduced and further higher input/output characteristics can be exerted.

The particle size distribution of the inorganic phosphate compound is preferable to show a relatively sharp single-modal type distribution in a chart that shows a particle size along a horizontal axis and an abundance ratio (frequency)

along a vertical axis. For example, in a particle size distribution, based on the volume, a peak of particles of the greatest frequency (mode diameter) is preferable to be 6% by volume or more (typically, 7% by volume or more, for example, 8% by volume or more, further, 10% by volume or more). In other words, particle sizes are preferable to be relatively uniform. According to such a structure, still higher battery performance can be stably exerted. Further, although the mode diameter in the particle size distribution based on the volume described above is not particularly limited, for example, it can be set to about 0.01 μm to 5 μm (typically, 0.1 μm to 4 μm). From this, since the particles of the inorganic phosphate compound are preferably filled in a gap of the positive electrode active material thereby, further higher electron conductivity can be imparted to the positive electrode. Alternatively, the mode diameter can be set to also about 10 μm to 15 μm (typically, 10 μm to 12 μm). Since the particle size of the positive electrode active material described above is typically about 5 μm to 20 μm, by containing a large amount of the inorganic phosphate compound having the substantially the same particle size therewith, the positive electrode (positive electrode active material layer) homogeneous in a thickness direction, for example, can be realized.

Although the average particle size of the inorganic phosphate compound is not particularly limited, it can be set to, for example, about 0.01 μm to 5 μm (typically, 0.1 μm to 4 μm) based on the volume. Alternatively, the average particle size described above can be set to about 10 μm to 15 μm (typically, 10 μm to 12 μm).

As such an inorganic phosphate compound, substances having ion conductivity can be used without particular restriction. Above all, the substances having high ion conductivity and low electron conductivity (substantially showing insulation property) are preferable. As a preferred example that shows such a property, inorganic solid electrolyte materials that are known to be able to work as an electrolyte of an all-solid battery can be used. For example, when a charge carrier ion is a lithium ion, a phosphate-based lithium ion conductor such as $Li_3PO_4$ and LiPON (lithium phosphorous oxynitride); a nasicon type lithium ion conductor such as $Li_{1.5}Al_{0.5}Ge_{1.5}(PO_4)_3$; perovskite type lithium ion conductor; thio-LISICON type lithium ion conductor; and the like can be illustrated. Although, in the above, examples in which the charge carrier ion is $Li^+$ are shown, other cations (typically, alkali metal ions such as $Na^+$ and $K^+$, alkali earth metal ions such as $Mg^{2+}$ and $Ca^{2+}$) can be used. As specific examples, $Li_3PO_4$, $Na_3PO_4$, $K_3PO_4$, $Mg_3(PO_4)_2$, $Ca_3(PO_4)_2$ and the like can be used.

In the technique disclosed here, the inorganic phosphate compound has a particulate shape. Although a shape of particle is not particularly limited, it is preferable that, for example, a ratio of a length of the longest side and a length of the shortest side (aspect ratio) is preferably set to substantially 1 to 2 (for example, 1 to 1.2). In other words, a substantially spherical particle can be preferably used. As the aspect ratio, at least 30 or more particles (for example, 30 particles to 100 particles) are observed with a SEM (Scanning Electron Microscope), and an average arithmetic value of aspect ratios calculated from obtained images can be adopted.

The inorganic phosphate compound contained in the positive electrode is adequate to be set to 0.1 parts by mass to 5 parts by mass with respect to 100 parts by mass of the positive electrode active material and usually preferable to be set to 0.5 parts by mass to 2 parts by mass. When an addition amount of the inorganic phosphate compound of which electron conductivity is low is suppressed to a low level, preferred electron conductivity can be imparted to the positive electrode, and the internal resistance can be reduced to a further lower level.

As the conductive material, for example, carbon materials such as carbon black (typically, acetylene black, Ketjen black), activated carbon, graphite and carbon fiber can be preferably used. As the binder, for example, polymer materials such as a halogenated vinyl resin such as polyvinylidene fluoride (PVdF) and polyalkylene oxide such as polyethylene oxide (PEO) can be preferably used. Further, as long as the effect of the present invention is not drastically damaged, in addition to the materials described above, various kinds of additives (for example, an inorganic compound that generates gas during overcharging, a dispersant, a thickener and the like) can be used as well.

A ratio of the positive electrode active material in an entire positive electrode active material layer is adequately set to about 50% by mass or more (typically, 50% by mass to 95% by mass), and usually preferably set to about 80% by mass to 95% by mass. A ratio of the inorganic phosphate compound in the entire positive electrode active material layer is can be set to, for example, about 0.1% by mass to 5% by mass, and usually preferably set to about 0.5% by mass to 2% by mass. When the conductive material is used, a ratio of the conductive material in the entire positive electrode active material layer can be set to, for example, about 2% by mass to 20% by mass, and usually preferably set to about 2% by mass to 15% by mass. When the binder is used, a ratio of the binder in the entire positive electrode active material layer can be set to, for example, about 0.5% by mass to 10% by mass, and usually preferred to be set to about 1% by mass to 10% by mass.

Negative Electrode

The negative electrode of the nonaqueous electrolyte secondary battery disclosed here typically includes a negative electrode current collector and a negative electrode active material layer formed on the negative electrode current collector and at least a negative electrode active material. Such a negative electrode can be prepared in such a manner that, for example, a composition obtained by dispersing forming components of the negative electrode active material layer in an adequate solvent (for example, water) is imparted on a surface of the negative electrode current collector and dried. The forming components of the negative electrode active material layer described above can include the negative electrode active material and a binder and the like that are used as required. Further, as the negative electrode current collector, conductive materials made of metal having excellent conductivity (for example, copper, nickel, titanium, stainless steel, or the like) can be preferably used.

As the negative electrode active material, one or two or more kinds of materials that have been used in the nonaqueous electrolyte secondary battery can be used without particular restriction. Specifically, carbon materials such as graphite, hard carbon (non-graphitizable carbon) and soft carbon (graphitizable carbon); metal oxide materials such as silicon oxide, titanium oxide, vanadium oxide and lithium titanium composite oxide (LTO); metal nitrides such as lithium nitride, lithium cobalt composite nitride and lithium nickel composite nitride; and the like can be used. Among these, graphite-type carbon material can be preferably used.

As the binder, from the polymer materials illustrated as the binders for the positive electrode active material layer described above, an adequate polymer material can be selected. Specifically, styrene butadiene rubber (SBR), polyvinylidene fluoride (PVdF), polytetrafluoroethylene (PTFE), carboxymethylcellulose (CMC), methylcellulose (MC) and the like can be illustrated. Other than the above, various additives such as a dispersant, a thickener and a conductive material can be properly used.

A ratio of the negative electrode active material in an entire negative electrode active material layer is properly set to about 50% by mass or, more, preferably 90% by mass to 99% by mass (for example, 95% by mass to 99% by mass). When the binder is used, a ratio of the binder in the entire negative electrode active material layer can be set to, for example, about 1% by mass to 10% by mass, usually it is adequate to set to about 1% by mass to 5% by mass.

Nonaqueous Electrolyte

The nonaqueous electrolytes of the nonaqueous electrolyte secondary battery disclosed here typically shows a liquid state in normal temperature (for example, 25° C.), and preferably always shows a liquid state in a service temperature region (for example, −20° C. to 60° C.). As the nonaqueous electrolyte, a solution obtained by dissolving or dispersing a supporting salt (For example, lithium salt, sodium salt, magnesium salt, or the like. Lithium salt in the lithium ion secondary battery.) in a nonaqueous solvent can be preferably used. Alternatively, a solid state (typically, so-called gel-like state) nonaqueous electrolyte obtained by adding a polymer to a liquid nonaqueous electrolyte may be used. As the supporting salt, the supporting salt the same as that used in a general nonaqueous electrolyte secondary battery can be used by properly selecting, for example, a lithium salt such as $LiPF_6$, $LiBF_4$, $LiCO_4$, $LiAsF_6$, $Li(CF_3SO_2)_2N$ and $LiCF_3SO_3$ can be used. Among these, $LiPF_6$ can be preferably used. A concentration of the supporting salt described above is preferred to be prepared to be in the range of 0.7 mol/L to 1.3 mol/L.

As the nonaqueous solvent, organic solvents such as various carbonates, ethers, esters, nitriles, sulfones and lactones, which are used in a general nonaqueous electrolyte secondary battery can be used without particular restriction. As specific examples, ethylene carbonate (EC), propylene carbonate (PC), diethyl carbonate (DEC), dimethyl carbonate (DMC), ethylmethyl carbonate (EMC) and the like can be used.

According to a preferred aspect, the nonaqueous electrolyte described above includes a fluorine-containing nonaqueous solvent. As the fluorine-containing nonaqueous solvent, for example, fluorides of organic solvents (organic compounds) that are known to be used as the nonaqueous solvent of the nonaqueous electrolyte secondary battery can be used. In other words, organic solvents having a chemical structure in which at least one hydrogen atom of an organic solvent that does not contain fluorine as a constituent element (for example, carbonates, ethers, esters, nitriles, sulfones, lactones and the like, which are described above) is substituted with a fluorine atom can be used. Among these, one or two or more kinds of fluorinated carbonates can be preferably contained. From this, a high oxidation potential (high oxidation resistance) can be realized. As the fluorinated carbonate, fluorinated cyclic carbonates such as monofluoroethylene carbonate (MFEC) and difluoroethylene carbonate (DFEC); and fluorinated chain carbonate such as fluoromethyl methyl carbonate, difluoromethyl methyl carbonate, trifluoromethyl methyl carbonate and fluoromethyl difluoromethyl carbonate (TFDMC) can be illustrated.

According to a preferred aspect, as the fluorine-containing nonaqueous solvent, at least one kind fluorinated chain carbonate and at least one kind fluorinated cyclic carbonate are contained. In the nonaqueous electrolyte having a composition like this, the fluorinated chain carbonate (preferably, fluorinated straight chain carbonate) can be useful in making the nonaqueous electrolyte a liquid state at normal temperature (for example, 25° C.) or in making the viscosity of the nonaqueous electrolyte lower.

The fluorine-containing nonaqueous solvent like this is preferred to be contained, when an entire component excluding the supporting salt from the nonaqueous electrolyte is set to 100% by mass, at a ratio of 1% by mass or more (typically, 5% by mass to 100% by mass, for example, 30% by mass to 100% by mass, preferably 50% by mass to 100% by mass), and may be substantially 100% by mass (typically, 99% by mass or more) of the components except the supporting salt. Alternatively, both the fluorine-containing nonaqueous solvent and the nonaqueous solvent that does not contain fluorine as the constituent element may be contained. In such a case, a ratio of the nonaqueous solvent that does not contain a fluorine element is preferable to be a ratio of 70% by mass or less of the components other than the supporting salt contained in the electrolyte, for example and more preferably 60% by mass (for example, 50% by mass) or less. Further, as long as the effect of the present invention is not drastically damaged, various kinds of additives (for example, film-forming material such as lithium bis(oxalato)borate (LiBOB), vinylene carbonate (VC), vinyl ethylene carbonate (VEC) and fluoroethylene carbonate (FEC); compounds that can generate gas during overcharging such as biphenyl (BP) and cyclohexyl benzene (CHB); and the like) can be properly contained in the nonaqueous electrolyte.

Although it is not intended to particularly limit, as a schematic structure of the nonaqueous electrolyte secondary battery according to an embodiment of the present invention, with the nonaqueous electrolyte secondary battery (single battery) schematically shown in FIG. 1 as an example, the present invention will be described in detail. In the following drawings, the like reference numerals are given to the like members and like sites that exert the like effect and duplicating description thereof may be omitted or simplified. A dimensional relationship (length, width, thickness and the like) in the respective drawings does not necessarily reflect an actual dimensional relationship.

Figure 1:
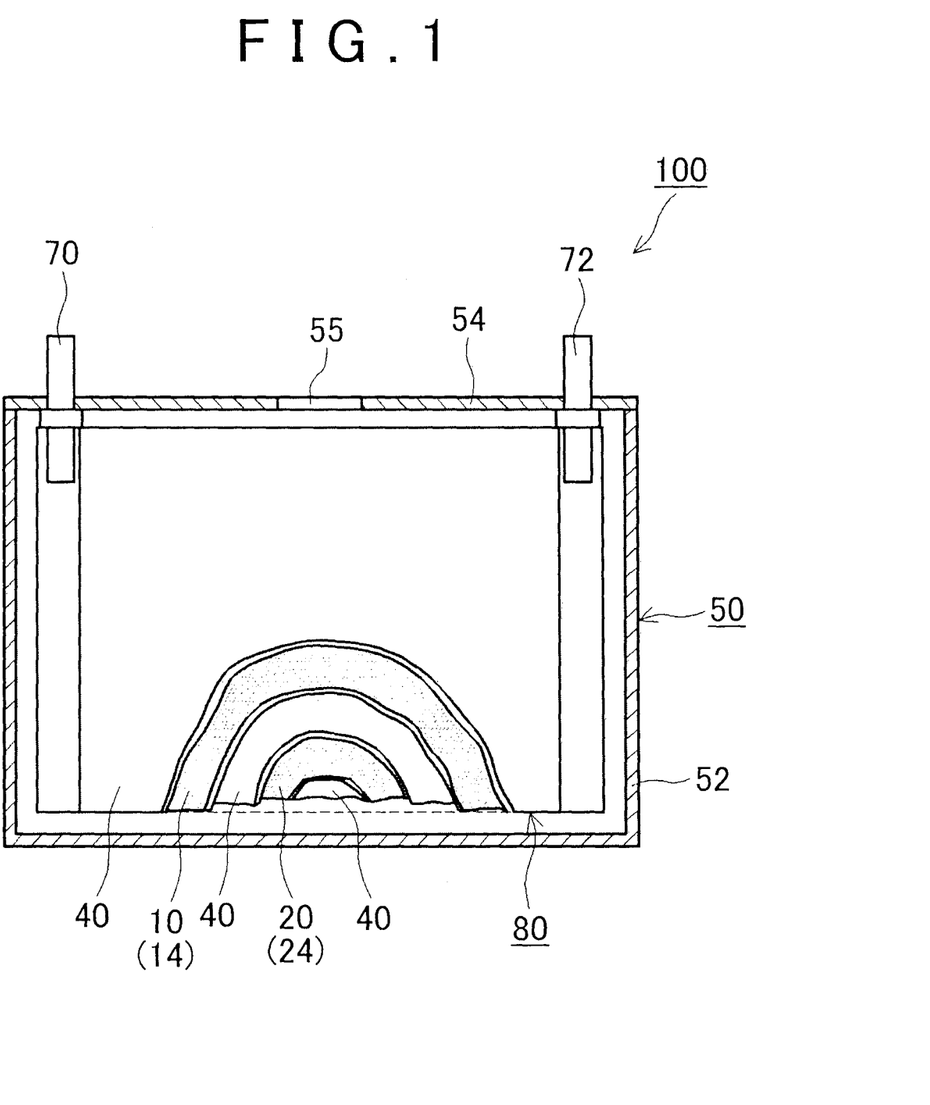
FIG. 1 is a diagram that schematically shows a cross-sectional structure of a nonaqueous electrolyte secondary battery according to an embodiment.

A nonaqueous electrolyte secondary battery 100 shown in FIG. 1 has a structure in which an electrode body (wound electrode body) 80 that has a shape in which a positive electrode sheet 10 and a negative electrode sheet 20 that are wound into a flat shape via a separator sheet 40 is housed in a flat box type battery case 50 together with a nonaqueous electrolyte (not shown).

The battery case 50 includes a flat rectangular parallelepiped (box type) battery case body 52 that is opened at an upper end and a lid body 54 that closes the opening part. As a material of the battery case 50, relatively light weight metal (for example, aluminum or aluminum alloy) can be preferably used. On an upper surface (that is, the lid body 54) of the battery case 50, a positive electrode terminal 70 for external connection that electrically connects with a positive electrode of the wound electrode body 80 and a negative electrode terminal 72 for electrically connecting with a negative electrode of the wound electrode body 80 are arranged. The lid body 54 also includes, in the same manner as a battery case of a conventional nonaqueous electrolyte secondary battery, a safety valve 55 that externally discharges gas generated inside of the battery case 50.

Inside the battery case 50, the flat wound electrode body 80 is housed together with the nonaqueous electrolyte (not shown). The wound electrode body 80 includes a long sheet-like positive electrode (positive electrode sheet) 10 and a long sheet-like negative electrode (negative electrode sheet) 20. The positive electrode sheet 10 includes a long positive electrode current collector and a positive electrode active material layer 14 formed along a long direction on at least one surface thereof (typically, both surfaces). The negative electrode sheet 20 includes a long negative electrode current collector and a negative electrode active material layer 24 formed along a long direction on at least one surface thereof (typically, both surfaces). Further, between the positive electrode active material layer 14 and the negative electrode active material layer 24, two long sheet-like separators (separator sheet) 40 are disposed as an insulating layer for preventing a direct contact of both. As the separator sheet 40, a porous sheet formed of a resin such as polyethylene (PE), polypropylene (PP), polyester, cellulose and polyamide, and a nonwoven fabric, and the like can be used. The wound electrode body 80 like this can be prepared in such a manner that a stacked body obtained by sequentially superposing, for example, the positive electrode sheet 10, the separator sheet 40, the negative electrode sheet 20, and the separator sheet 40 is wound in a long direction, and by forming into a flat shape by bending by pressing the obtained wound body from a side surface direction.

In a width direction defined as a direction that advances from one end part to the other end part in a winding axis direction of the wound electrode body 80, at a center part thereof, a winding core part is formed, in which the positive electrode active material layer 14 formed on a surface of the positive electrode current collector and the negative electrode active material layer 24 formed on a surface of the negative electrode current collector are superposed and densely stacked. Further, at both end parts of the wound electrode body 80 in the winding axis direction, a positive electrode active material layer non-forming part of the positive electrode sheet 10 and a negative electrode active material layer non-forming part of the negative electrode sheet 20, respectively, stick out to the outside from the winding core part. Then, a positive electrode current collector plate and a negative electrode current collector plate are attached to a positive electrode-sticking out part and a negative electrode-sticking out part, respectively, and are electrically connected with the positive electrode terminal 70 and the negative electrode terminal 72, respectively.

The nonaqueous electrolyte secondary battery 100 having such a structure can be formed, for example, in such a manner that the wound electrode body 80 is housed inside of the battery case 50 from an opening part thereof, after the lid body 54 is attached to the opening part of the case 50, the nonaqueous electrolyte is injected from an injection hole (not shown) disposed in the lid body 54, next such an injection hole is sealed by welding or the like.

The nonaqueous electrolyte secondary battery (typically, lithium ion secondary battery) disclosed here can be used in various applications and is characterized in that a metal element is preferably suppressed from being eluted from the positive electrode active material and battery characteristics higher than that of a conventional product can be realized (for example, excellent input/output characteristics and high endurance are combined). Therefore, by utilizing features like this, the nonaqueous electrolyte secondary battery of the present invention can be preferably used in applications in which high energy density, high input/output density, and high endurance are required. As such applications, a driving power source that is mounted on a vehicle such as a plug-in hybrid vehicle, a hybrid vehicle and an electric vehicle can be cited. Such a secondary battery can be used in a form of a battery pack in which, typically, a plurality of secondary batteries is connected in series/or in parallel.

Hereinafter, some examples relating to the present invention will be described. However, it is not intended to limit the present invention to such examples.

Preparation of Inorganic Phosphate Compound

Figure 2:
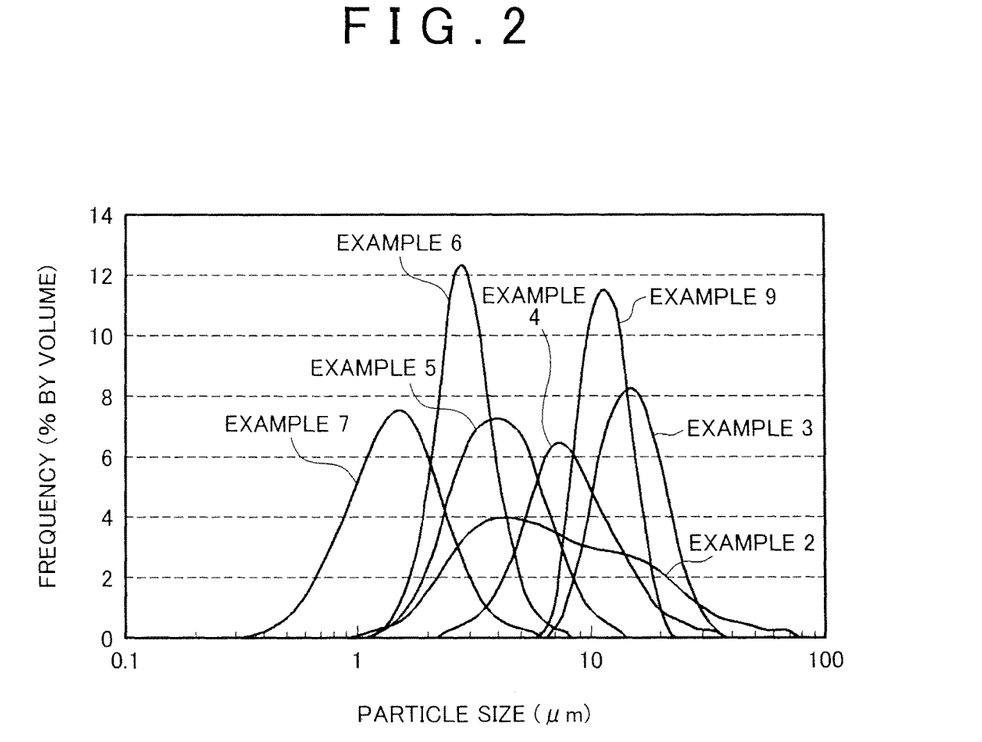
FIG. 2 is a chart that shows a particle size distribution based on the volume based on a laser diffraction light scattering method of an inorganic phosphate compound.

In the present example, $Li_3PO_4$ was used as the inorganic phosphate compound. Specifically, firstly, three kinds of commercially available $Li_3PO_4$ (Examples 2 to 4) having different particle size distributions were prepared. Next, after the $Li_3PO_4$ of Example 2 was pulverized by a jet mill, by classifying, four kinds of $Li_3PO_4$ having different particle size distributions (Examples 5 to 7 and Example 9) were prepared. The particle size distributions of these $Li_3PO_4$ were measured by a laser diffraction light scattering method. The obtained particle size distributions based on the volume of Examples 2 to 7 and Example 9 are shown in FIG. 2. Further, $Li_3PO_4$ having the particle size distribution of Example 2 was microparticulated by "Nanocreator" manufactured by Hosokawa Micron Corporation and differentiated, and $Li_3PO_4$ of finer particles (Example 8) was obtained thereby. Average particle sizes and ratios of particles having a particle size of 20 μm or more of Examples 2 to 9 are shown in Table 1. In Table 1, only an average particle size of Example 8 is calculated from the BET specific surface area. More specifically, when all $Li_3PO_4$ particles are assumed to have a homogeneous spherical shape, since a volume of a sphere is $(4/3)\pi r^3$, and a surface area of a sphere is $4\pi r^2$, with the BET specific surface area (59.87 $m^2/g$) of Example 8 and known density (2.42 $g/cm^3$), from density× volume=surface area/BET specific surface area, $2r \approx 41$ nm was calculated.

Preparation of Positive Electrode (Example 1)

As the positive electrode active material, NiMn spinel ($LiNi_{0.5}Mn_{1.5}O_4$) having an average particle size of 13.3 μm was prepared. The positive electrode active material, acetylene black (AB) as the conductive additive and polyvinylidene fluoride (PVdF) as the binder were measured such that $LiNi_{0.5}Mn_{1.5}O_4$:AB:PVdF=89:8:3 by mass ratio, and mixed with N-methyl-2-pyrrolidone (NMP), and a slurry-like composition was prepared thereby. The composition was coated on aluminum foil (positive electrode current collector) having a thickness of 15 μm and dried to form a positive electrode active material layer, and a positive electrode (Example 1) was prepared thereby.

Preparation of Positive Electrode (Examples 2 to 9)

Firstly, the positive electrode active material and $Li_3PO_4$ prepared in the above were mixed, respectively, at a mass ratio of 100:1. Then, such a mixture, acetylene black (AB) as the conductive additive and polyvinylidene fluoride (PVdF) as the binder were measured to be ($LiNi_{0.5}Mn_{1.5}O_4$+ $Li_3PO_4$):AB:PVdF=89:8:3 by mass ratio, and mixed with NMP, and a slurry like composition was prepared thereby. Then, the composition was coated on aluminum foil (positive electrode current collector) having a thickness of 15 μm and dried to form a positive electrode active material layer, and positive electrodes (Examples 2 to 9) were prepared thereby.

Preparation of Negative Electrode

Graphite (C) as the negative electrode active material and carboxymethylcellulose (CMC) and styrene butadiene rubber (SBR) as the binder were measured to be C:CMC:SBR=98:1:1 by mass ratio, and mixed with ion-exchanged water, and a slurry-like composition was prepared thereby. The composition was coated on copper foil (negative electrode current collector) having a thickness of 10 μm and dried, and a negative electrode active material layer was formed thereby.

Establishment of Nonaqueous Electrolyte Secondary Battery

The positive electrode and the negative electrode prepared in the above were stacked via the separator and electrode bodies (Examples 1 to 9) were prepared thereby. As the separator, a porous film having a three-layer structure of polyethylene (PE)/polypropylene (PP)/polyethylene (PE) and a thickness of 20 μm was used. Further, in a mixed solvent in which monofluoroethylene carbonate (MFEC) as the cyclic carbonate and fluoromethyldifluoromethyl carbonate (TFDMC) as the chain carbonate were mixed at a volume ratio of 1:1, $LiPF_6$ as the supporting salt was dissolved to be a concentration of 1.0 mol/L, and a nonaqueous electrolyte was prepared thereby. The electrode body and nonaqueous electrolyte described above were housed in a laminate battery case and sealed thereafter, and lithium ion secondary batteries (Examples 1 to 9) were established.

Conditioning Treatment

The batteries (Examples 1 to 9) established in the above were subjected to the conditioning treatment by repeating the following charge/discharge patterns (1) and (2) three times under a temperature environment of 25° C. (1) After a constant current (CC) charge is conducted at a rate of 1/3C until a positive electrode potential becomes 4.9 V, the CC charge is suspended for 10 minutes. (2) After a CC discharge is conducted at a rate of 1/3C until a positive electrode potential becomes 3.5 V, the CC discharge is suspended for 10 minutes. And, a discharge capacity at the third cycle was taken as an initial capacity (initial discharge capacity).

Initial Resistance

The batteries (Examples 1 to 9) after the conditioning treatment described above were subjected to the CC charge at a rate of 1/3C until the SOC becomes 60% under a temperature environment of 25° C. The batteries that were adjusted to the state of SOC 60% were subjected to the CC discharge at each rate of 1C, 3C, 5C and 10C, and, for each thereof, a voltage drop amount for 10 seconds after a discharge start was measured. By dividing a value of the measured voltage drop (V) with a corresponding current value (for example, 20 mA at 1/3C), an IV resistance (Ω) was calculated, and average value thereof was taken as an initial resistance. Results are shown in Table 1.

High Temperature Endurance Test

Then, the batteries after measurement of the initial performance (Example 1 to 9) were left at rest for two hours or more in a thermostat set to a temperature of 60° C., the following charge/discharge operations (1) and (2) were repeated 200 cycles. (1) After the CC charge is conducted at a rate of 2C up to 4.9 V, the CC charge is suspended for 10 minutes. (2) After the CC discharge is conducted at a rate of 2C down to 3.5 V, the CC discharge is suspended for 10 minutes. After that, in the same manner as the measurement of the initial capacity described above, discharge capacity was measured. The capacity retention rate (%) was calculated as a ratio of the discharge capacity after the high temperature endurance test to the initial capacity ((discharge capacity after the high temperature endurance test/initial capacity)×100(%)). Results are shown in Table 1. Further, in FIG. 3, a relationship between the endurance (capacity retention rate) and the initial resistance is shown.

TABLE 1

| | Inorganic phosphate compound | | | Initial resistance (Ω) | Capacity retention rate (%) |
|---|---|---|---|---|---|
| | Kind | Average particle size ($D_{50}$) | Content ratio of ≥20 μm (% by volume) | | |
| Example 1 | (Nothing) | — | — | 1.47 | 65.5 |
| Example 2 | $Li_3PO_4$ | 6.1 μm | 12.8 | 2.30 | 82.8 |
| Example 3 | $Li_3PO_4$ | 18 μm | 18.7 | 2.19 | 83.0 |
| Example 4 | $Li_3PO_4$ | 8.1 μm | 5.3 | 2.18 | 83.4 |
| Example 5 | $Li_3PO_4$ | 3.8 μm | 0 | 1.79 | 83.1 |
| Example 6 | $Li_3PO_4$ | 2.6 μm | 0 | 1.88 | 84.0 |
| Example 7 | $Li_3PO_4$ | 1.4 μm | 0 | 1.85 | 82.4 |
| Example 8 | $Li_3PO_4$ | 41 nm* | 0 | 1.87 | 82.8 |
| Example 9 | $Li_3PO_4$ | 11 μm | 0.6 | 1.90 | 82.6 |

*Calculated from the BET specific surface area.

Figure 3:
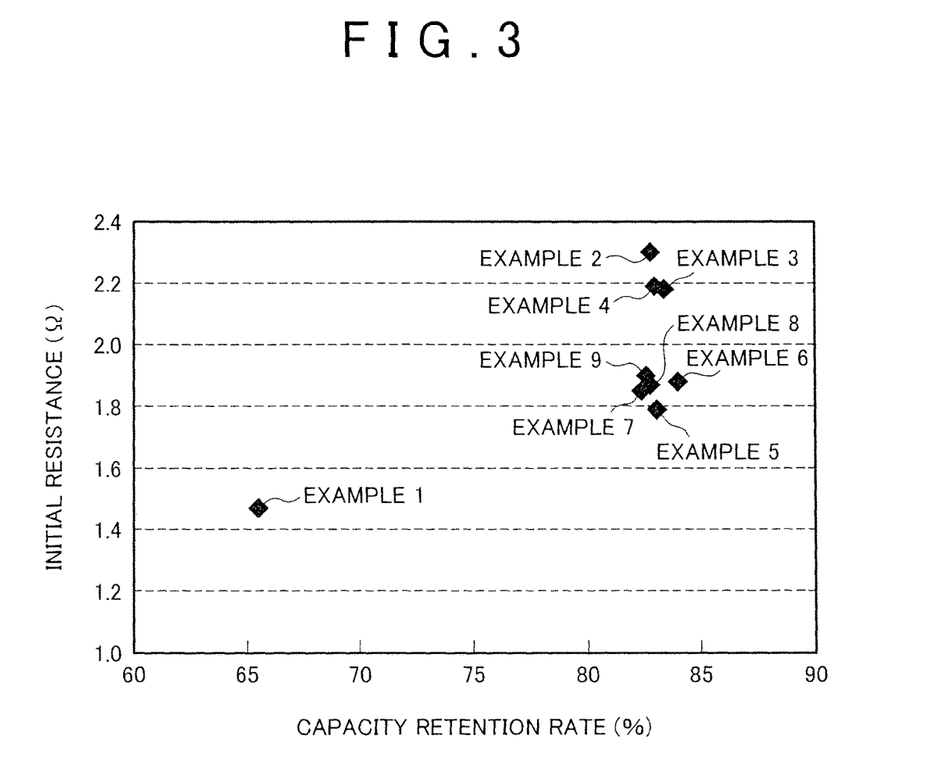
FIG. 3 is a graph that shows a relationship between endurance (capacity retention rate) and initial resistance.

As obvious from Table 1 and FIG. 3, Example 1 that does not contain $Li_3PO_4$ in the positive electrode had relatively low capacity retention rate and was deficient in the endurance. Further, Examples 2 to 4 had the endurance improved compared with that of Example 1 but showed an increase in the resistance as trade-off. On the other hand, Examples 5 to 9 had high endurance and the initial resistances that were suppressed to a relatively low level. When the present inventors studied about the reason of this, it was found that while $Li_3PO_4$ of Example 9 contained particles having a particle size of substantially 20 μm or less, $Li_3PO_4$ of Example 3 contained many particles having a particle size of 20 to 30 μm (FIG. 2), and it was assumed that this contributes to an increase in the resistance. Further, it was found that also Example 9 that contains 0.6% of particles having a particle size of 20 μm or more showed the performance the same as that of Examples 5 to 8 that do not substantially contain particles having a particle size of 20 μm or more. From this, it was found that, even if $Li_3PO_4$ having a particle size of 20 μm or more is contained, when it is 1% or less (for example, 0.6% or less) with respect to an entire amount, low resistance and high endurance can be combined at a high level. As was described above, the nonaqueous electrolyte secondary battery having a structure disclosed here can realize high battery performance (for example, combine excellent input/output characteristics and high endurance). Such a result shows technical significance of the present invention.

In the above, the present invention has been described in detail. However, embodiments and examples described above are only illustrations, and in the invention disclosed here various modifications and alterations of the aforementioned specific examples are contained.

The invention claimed is:
1. A nonaqueous electrolyte secondary battery comprising:
a positive electrode including a positive electrode active material and an inorganic phosphate compound having ion conductivity, the positive electrode having an operation upper limit potential of 4.3 V or more based on metal lithium, the inorganic phosphate compound having a particle shape, a ratio of particles of the inorganic phosphate compound having a particle size of 20 μm or more is from greater than 0% by volume to 1% by volume when an entirety of the inorganic phosphate compound is set to 100% by volume;

a negative electrode; and a nonaqueous electrolyte, wherein a mode diameter of the particles of the inorganic phosphate compound based on the volume is 10 μm to 15 μm, and a peak of the particles of the inorganic phosphate compound of the greatest frequency is 6% by volume or more.

2. The nonaqueous electrolyte secondary battery according to claim 1, wherein
the ratio of the particles of the inorganic phosphate compound having a particle size of 20 μm or more is one particle or less with respect to 1000 particles of the inorganic phosphate compound.

3. The nonaqueous electrolyte secondary battery according to claim 1, wherein
a ratio of particles of the inorganic phosphate compound having a particle size of 10 μm or more is 10% by volume or less, when the entirety of the inorganic phosphate compound is set to 100% by volume.

4. The nonaqueous electrolyte secondary battery according to claim 1, wherein
the inorganic phosphate compound includes at least one kind of $Li_3PO_4$, LiPON, $Na_3PO_4$ and $Mg_3(PO_4)_2$.

5. The nonaqueous electrolyte secondary battery according to claim 1, wherein
a ratio of the inorganic phosphate compound is 0.1 parts by mass to 5 parts by mass with respect to 100 parts by mass of the positive electrode active material.

6. The nonaqueous electrolyte secondary battery according to claim 1, wherein
the positive electrode active material includes a lithium nickel manganese composite oxide having a spinel structure.

7. The nonaqueous electrolyte secondary battery according to claim 6, wherein
the positive electrode active material includes 50% by mass to 100% by mass of the lithium nickel manganese composite oxide based on the positive electrode active material.

8. The nonaqueous electrolyte secondary battery according to claim 1, wherein
the nonaqueous electrolyte includes fluorinated carbonate.

9. The nonaqueous electrolyte secondary battery according to claim 1, wherein
the ratio of the particles of the inorganic phosphate compound having a particle size of 20 μm or more is from greater than 0% by volume to 0.6% by volume, when the entirety of the inorganic phosphate compound is set to 100% by volume.

10. The nonaqueous electrolyte secondary battery according to claim 1, wherein
a peak of the particles of the inorganic phosphate compound of the greatest frequency is 7% by volume or more.

11. The nonaqueous electrolyte secondary battery according to claim 1, wherein
a peak of the particles of the inorganic phosphate compound of the greatest frequency is 8% by volume or more.

12. The nonaqueous electrolyte secondary battery according to claim 1, wherein
a peak of the particles of the inorganic phosphate compound of the greatest frequency is 10% by volume or more.

13. The nonaqueous electrolyte secondary battery according to claim 12, wherein
the ratio of the particles of the inorganic phosphate compound having a particle size of 20 μm or more is from greater than 0% by volume to 0.6% by volume, when the entirety of the inorganic phosphate compound is set to 100% by volume.

14. The nonaqueous electrolyte secondary battery according to claim 13, wherein
a ratio of the inorganic phosphate compound is 0.1 parts by mass to 5 parts by mass with respect to 100 parts by mass of the positive electrode active material.

* * * * *